(12) United States Patent
Rajaiah et al.

(10) Patent No.: US 7,291,831 B2
(45) Date of Patent: Nov. 6, 2007

(54) METHOD AND APPARATUS FOR AUTOMATIC MODULATION OF PHOTO-EMITTER BRIGHTNESS IN AN OPTICAL ENCODER

(75) Inventors: Seela Raj D. Rajaiah, Penang (MY); Hassan Bin Haji Hussain, Penang (MY)

(73) Assignee: Avago Technologies ECBUIP (Singapore) Pte Ltd, Singapore (SG)

( * ) Notice: Subject to any disclaimer, the term of this patent is extended or adjusted under 35 U.S.C. 154(b) by 122 days.

(21) Appl. No.: 10/799,850

(22) Filed: Mar. 12, 2004

(65) Prior Publication Data
US 2005/0199777 A1   Sep. 15, 2005

(51) Int. Cl.
*G01D 5/34* (2006.01)
(52) U.S. Cl. .................................. 250/231.13; 250/205

(58) Field of Classification Search ...........................
.................................................. 250/231.13–231.18
See application file for complete search history.

(56) References Cited

U.S. PATENT DOCUMENTS

| | | | | |
|---|---|---|---|---|
| 4,224,514 A * | 9/1980 | Weber | .................... | 250/231.16 |
| 5,015,836 A * | 5/1991 | Van Antwerp | .............. | 250/205 |
| 5,998,783 A * | 12/1999 | Stridsberg | .............. | 250/231.13 |
| 6,483,104 B1 * | 11/2002 | Benz et al. | ............ | 250/231.13 |
| 6,653,620 B2 * | 11/2003 | Blasing et al. | ......... | 250/231.13 |

\* cited by examiner

*Primary Examiner*—Thanh X. Luu
*Assistant Examiner*—Tony Ko

(57) ABSTRACT

A code strip, an optical encoder using such a strip and a method thereof are described. The code strip includes a calibration area. Light transmitted from a light source through the calibration area on the code strip is converted into an electrical calibration signal. This signal is a function of the transparency of the calibration area. The brightness of the light source is automatically modulated to compensate for degradation of transparency of the calibration area.

10 Claims, 5 Drawing Sheets

METHOD AND APPARATUS FOR AUTOMATIC MODULATION OF PHOTO-EMITTER BRIGHTNESS IN AN OPTICAL ENCODER

FIELD

The present invention relates to optical encoders. More particularly, the present invention pertains to a method and apparatus for automatically adjusting the brightness of the light source for an optical encoder to compensate for decreased transparency of the code strip.

BACKGROUND

Optical encoders are a versatile means of detecting motion. Optical encoders are used in industrial and agricultural machinery, as well as office equipment to detect linear and rotary motion and position. Typically, optical encoders have a disk or a plate containing opaque and transparent areas, called the code strip. The code strip passes between a light source (e.g., an LED) and a detector to interrupt the light beam from the light source. The resultant flickering is a signal which is received by photodiodes on a detector, and converted into electronic signals. The electronic signals that are generated are then fed into a controller where position and velocity data are calculated based upon the signals received. The light from the light source must be fully transmitted through the transparent areas on the code strip and fully blocked by the opaque areas.

Over time, normal operation of the device in which the optical encoder is located results in the collection of dust, ink spray and other contaminants on the code strip. An unclean code strip changes the amount of light received by the detector, resulting in erroneous, and eventually useless data. In an effort to overcome the problems associated with unclean code strips designers have developed wipers which can be assembled on a carriage or other associated moving part, and are used to clean contaminants off the codestrip. These wipers are cleaned periodically at service stations within the device. As this method of keeping the code strip clean is not perfect, the transparency of the code strip continually degrades. Designers study this degradation of transparency, and using empirical data, provide means to raise the current to the light source after specific intervals of operation. The current to the light source is increased in predetermined increments up to a maximum. The life span of the optical encoder depends on this compensation process.

Compensation on a predetermined schedule is an inefficient means of maintaining the integrity of the signal. From the time the code strip is dirty until the scheduled cleaning or until the scheduled increase in the brightness of the light source, the signal created by the optical encoder is distorted. A scheduled cleaning or a scheduled increase in the brightness of the light source which occurs before the transparency of the code strip is actually degraded is unnecessary. Any compensation mechanism employed too soon or too late is inefficient.

SUMMARY

Embodiments of the present invention pertain to a code strip, an optical encoder using such a disk and a method thereof. The code strip includes an indexing area, an encoding area, and a calibration area. Light transmitted through the calibration area is converted into an electrical signal which is used to determine whether or not the code strip is sufficiently transparent for the operation of the optical encoder. If not, circuitry within the optical encoder modulates the brightness of the light source such that the integrity of the signal generated by the encoder is maintained.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Reference will now be made in detail to various embodiments of the invention, examples of which are illustrated, by way of example and not by way of limitation, in the accompanying drawings. The drawings referred to in this description should not be understood as being drawn to scale except if specifically noted.

Figure 1A:
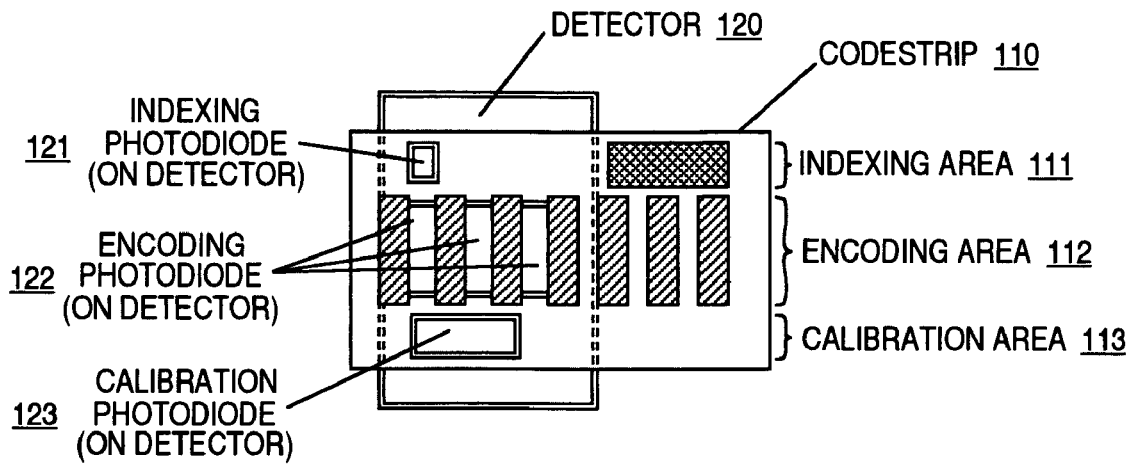
FIG. 1A illustrates the physical arrangement of the calibration photodiode on the detector and the calibration area on the code strip with respect to each other and the rest of the components of the optical encoder, from the point of view of the light source.

FIG. 1A shows a code strip (110) having an indexing area (111), an encoding area (112) and a calibration area (113). FIG. 1A is from the point of view of the light source. Light transmitted through the indexing area (111) is received by the indexing photodiode (121) on the detector (120). Light transmitted through the encoding area (112) is received by the encoding photodiode (122) on the detector (120). Light transmitted through the calibration area (113) is received by the calibration photodiode (123) on the detector (120). The photodiodes on the detector (120) receive only that light which passes through the transparent regions on the code strip. Any dust or other contaminants on the calibration area (113) will decrease the amount of light which the calibration photodiode (123) sees.

Figure 1B:
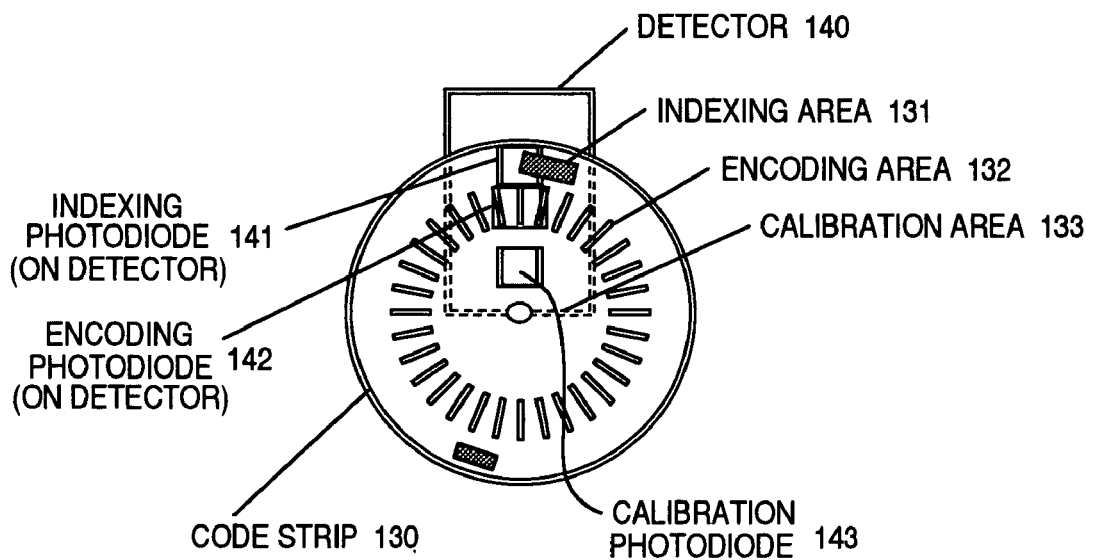
FIG. 1B illustrates an embodiment of the invention where the code strip is a circular disk, having the same indexing encoding and calibration areas. The detector is behind the code strip.

FIG. 1B illustrates a code strip (130) in the shape of a disk. The circular code strip (130) has an indexing area (131), an encoding area (132) and a calibration area (133). Light transmitted by the indexing area (131) is received by at least one indexing photodiode (141). Light transmitted by the encoding area (132) is received by at least one encoding photodiode (142). Light transmitted by the calibration area (133) is received by at least one calibration photodiode (143). Contaminants on the code strip (130) result in less light transmitted by the code strip (130). The calibration area (133) serves as a sample of the degree of transparency of the code strip (130) as a whole.

Figure 2:
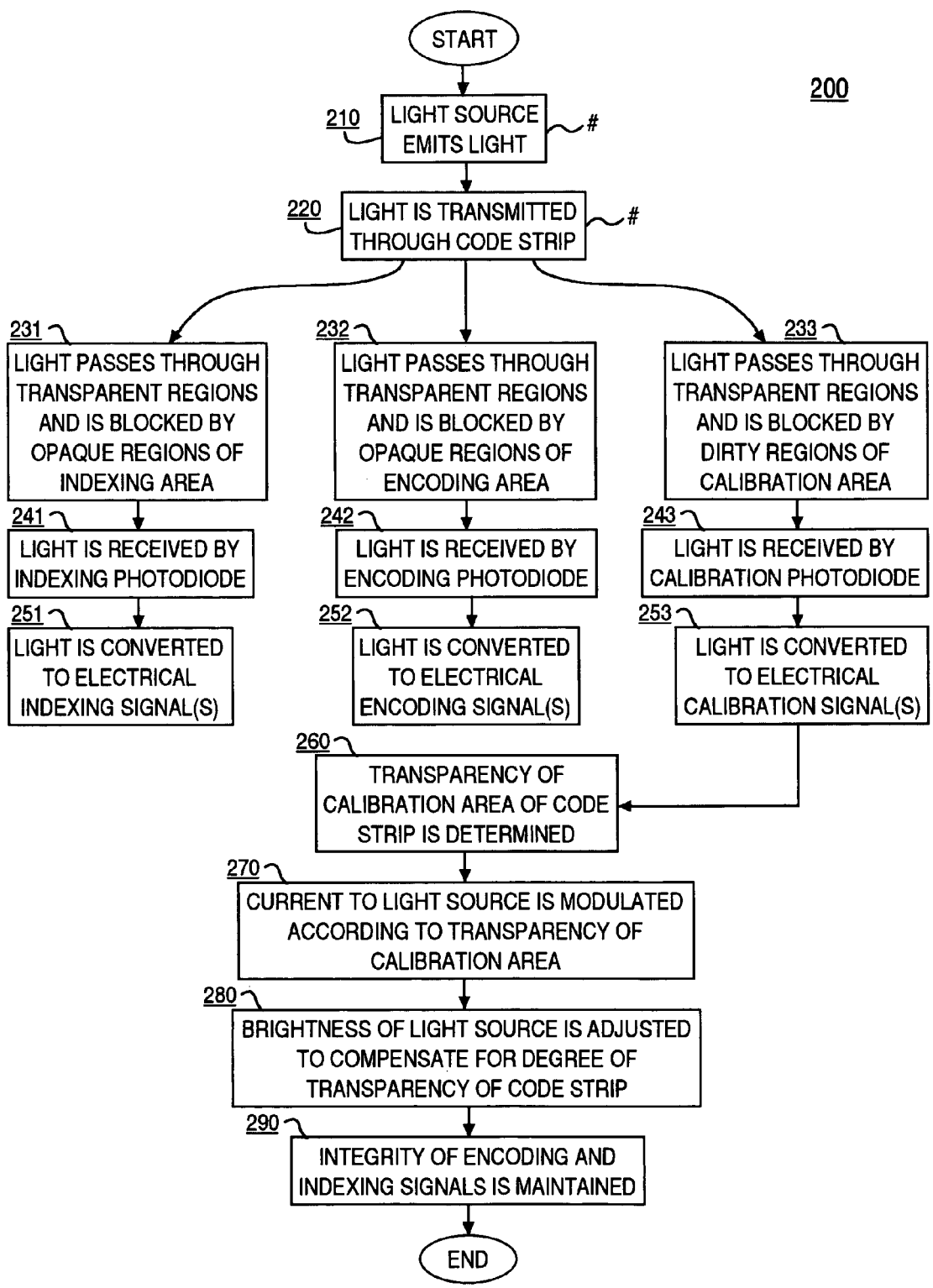
FIG. 2 is a flow chart illustrating that the light source emits light, which is transmitted through the code strip, and converted into electrical signals. One of these signals, the calibration signal, is used to determine the degree of transparency of the calibration area on the code strip. This information determines the modulation of the brightness of the light source.

FIG. 2 illustrates the process of utilizing the present invention. First, light is emitted by the light source (210). This light is transmitted through the code strip (220). A portion of this light passes through the indexing area of the code strip (231), a portion of which is received by the indexing photodiode (241) and converted into an electrical indexing signal (251). A portion of the light from the light source passes through the encoding area of the code strip (232), a portion of which is received by the encoding photodiode (242) and converted in the electrical encoding signal (252). A portion of the light from the light source (210) passes through the calibration area of the code strip (233), a portion of which is received by the calibration photodiode (243) and converted into the electrical calibration signal (253).

Using the electrical calibration signal (253), the transparency of the calibration area of the code strip is determined (260). The current to the light source is modulated according to the transparency of the calibration area (270), thus adjusting the brightness of the light source to compensate for the degree of transparency of the code strip as a whole (280). In this way, the integrity of the encoding and indexing electrical signals is maintained (290).

Figure 3:
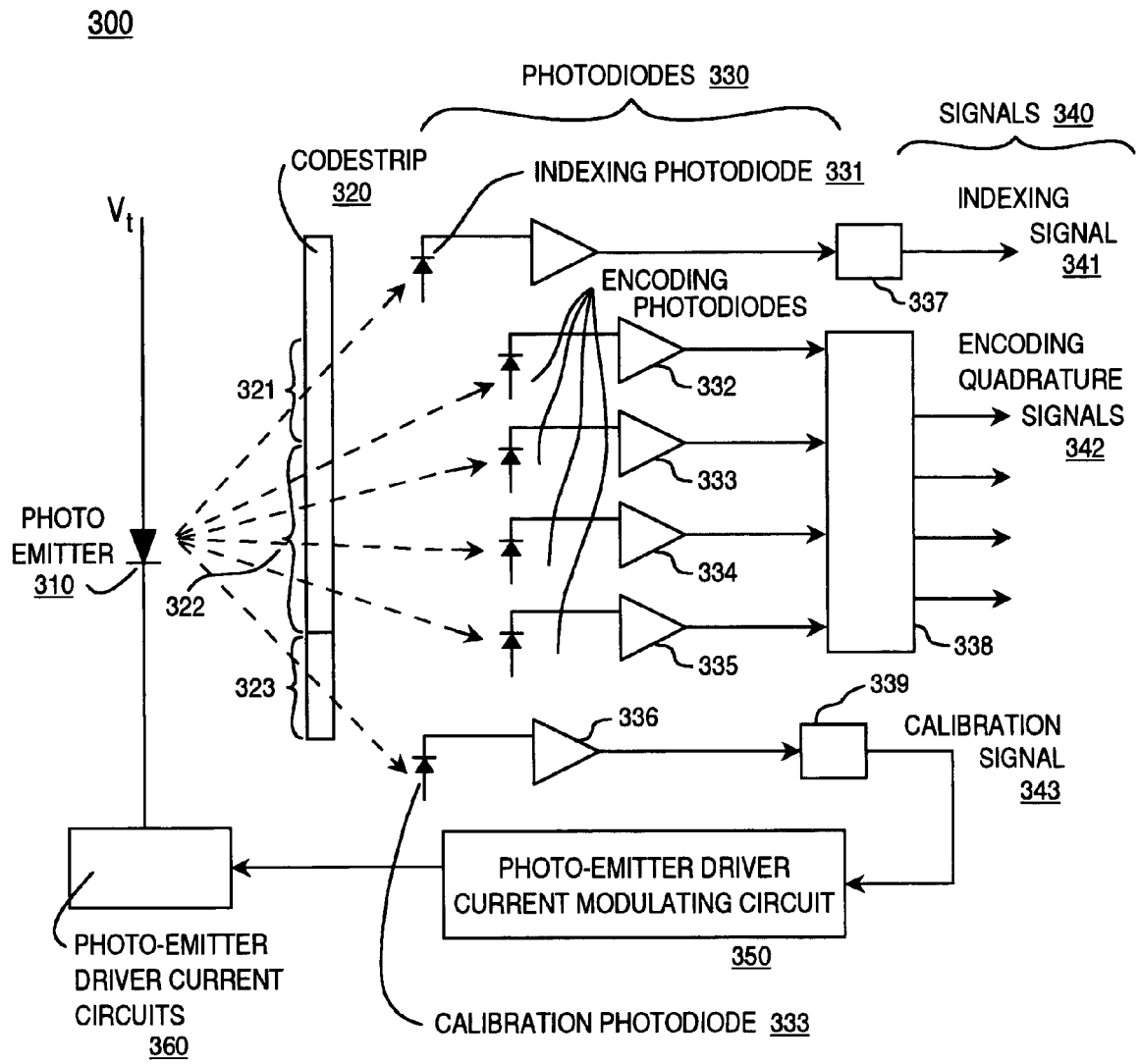
FIG. 3 is a diagram of the calibration circuit elements of an embodiment of the invention.

FIG. 3 is a side view of the photo-emitter, the code strip, the detector, and the circuit elements required for the present invention. FIG. 3 illustrates the closed loop nature of the present invention. Light from the photo-emitter (310) is used to evaluate the transparency of the code strip (320). The portion of the light which passes through the calibration area (323) of the code strip (320) is received by the calibration photodiode (333) and converted into the calibration signal (343). This signal (343) determines whether the current to the light source (310) will increase or remain the same.

Figure 4:
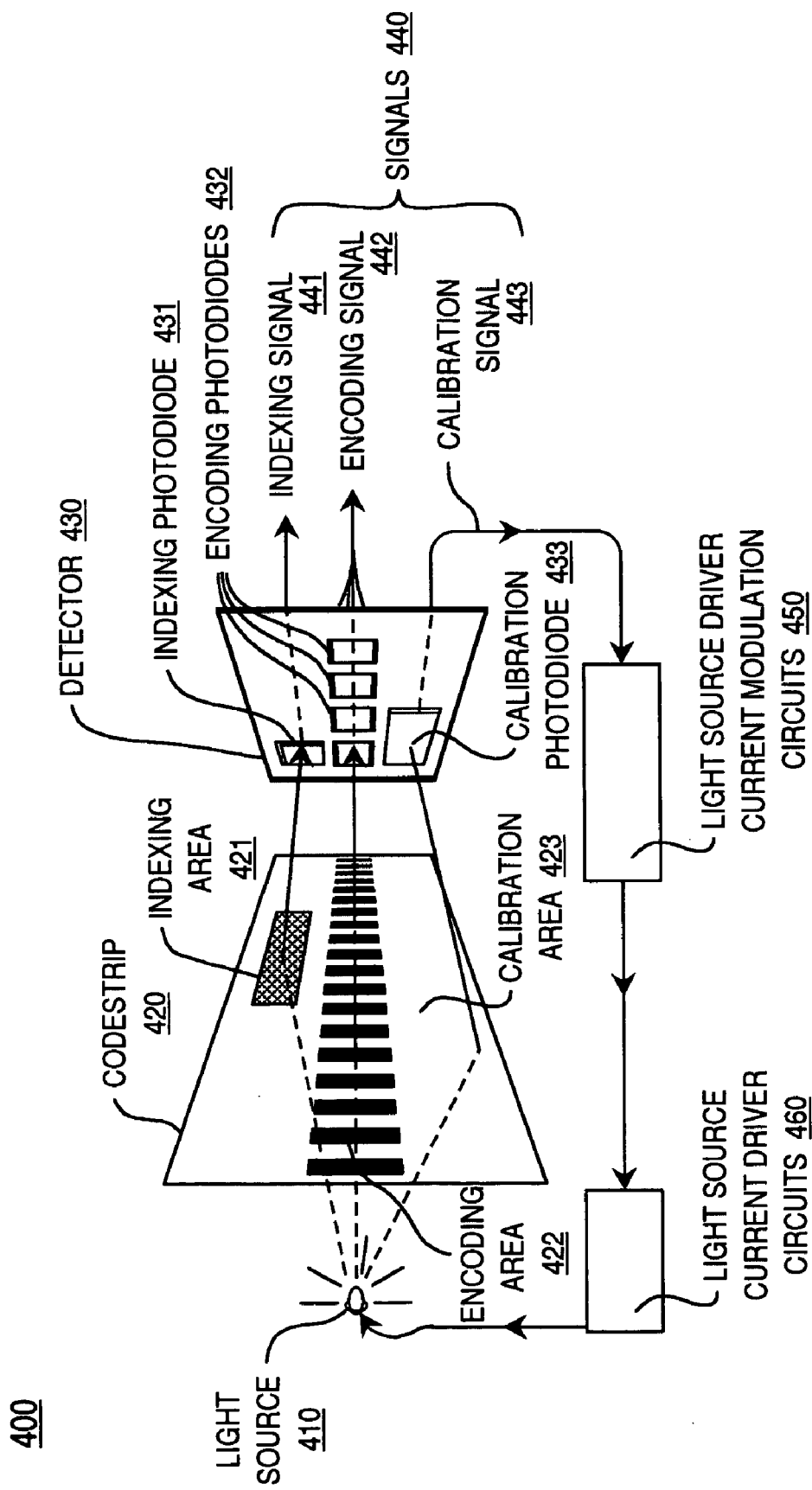
FIG. 4 is a representation of the arrangement of the physical components of an optical encoder having a calibration area on the code strip and a calibration photodiode on the detector. Also present in FIG. 4 are the circuit responsible for interpreting the calibration signal and the circuit which modulated the current to the light source. The brightness of the light source is adjusted in response to the degree of transparency of the calibration area of the code strip as detected by the calibration photodiode.

FIG. 4 is a three-dimensional view of physical elements of the optical encoder: the light source (410), the code strip (420), the detector (430), the circuit for modulating the current to the light source (450), and the current which controls the light source (460).

Figure 5:
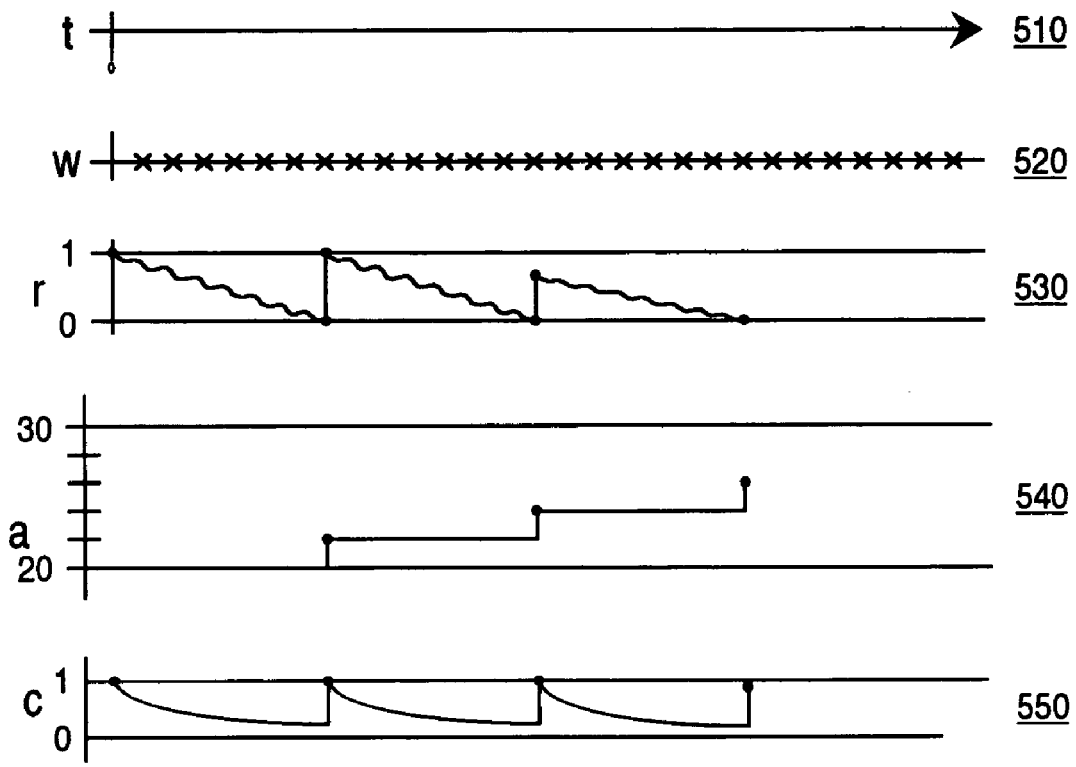
FIG. 5 is a graphical representation of the employment of the present invention. When the transparency of the code strip decreases to a certain threshold, the current to the light source is increased by a predetermined amount, thus restoring the clarity of the electrical signals generated by the optical encoder.

FIG. 5 is a series of graphs illustrating the relationship between the transparency of the code strip, the current to the light source, and the clarity of the electrical signal generated by the optical encoder. The following equations are utilized:

$$c = f(r,b) \text{ and } b = f(a)$$

where c is the clarity of the signal, r is the transparency of the code strip, b is the brightness of the light source, and a is the current to the light source.

In FIG. 5, the time line of operation is shown (510), with the zero being the point of initial operation of the device in which the optical encoder is installed, in this example a printer. The next line (520) shows the operation of the wiper, which is on a regular, predetermined schedule. It is possible that the operation of the wiper could be coordinated with the circuitry of the present invention, thus operating only as needed. The next graph (530) shows the transparency of the code strip over time. At zero time, transparency is at 1, i.e. it is sufficient. As contaminants deposit on the code strip, the transparency decreases. Although it increases every time the wiper operates, due to imperfections in the performance of the wiper, transparency generally decreases down to 0, i.e. insufficient. When the transparency of the code strip reaches 0, the clarity of the signal also approaches 0, as shown in graph 550. If the clarity of the signal were to reach 0, the signal would be distorted. Before the signal is distorted, the current to the light source is increased, as shown in graph 540, thereby restoring the transparency of the code strip back up to 1 (530) and the clarity of the signal back up to 1 (550). The integrity of the signal is maintained by monitoring the transparency of the code strip and adjusting the current to the light source when the transparency of decreases below a certain threshold, represented by the 1-line on graph 530.

The invention claimed is:

1. An optical encoding system, comprising:
   a light source configured to emit light;
   a code strip, comprising:
      a calibration area configured to generate a calibration signal, the calibration area having a degree of transparency associated therewith that decreases as contaminants collect on the code strip;
      an indexing area configured to generate an indexing signal; and
      an encoding area for generating an encoding signal;
   a photo detector, comprising:
      a calibration photodiode configured to convert light transmitted through the calibration area from the light source into an electrical calibration signal, the calibration signal being used to determine the degree of transparency of the calibration area;
      an indexing photodiode configured to convert light transmitted through the indexing area from the light source into an electrical indexing signal; and
      an encoding photodiode configured to convert light transmitted through the encoding area from the light source into an electrical encoding signal;
   a calibration circuit operably coupled to the photo detector and the light source, the circuit being configured to compare the degree of transparency to a threshold value and in the event the threshold value is greater than or equal to the degree of transparency, the calibration circuit further being configured to increase a current provided to the light source increase the brightness of light emitted therefrom in a direction of the indexing area and the encoding area.

2. The optical encoding system of claim 1, wherein the degree of transparency of the calibration area is representative of the degree of transparency of the code strip as a whole.

3. The optical encoding system of claim 1, wherein the current is increased when the degree of transparency is a predetermined amount above the threshold value.

4. The optical encoding system of claim 2, further comprising a wiper configured to wipe the code strip according to at least one of a predetermined schedule and in response to a command from the calibration circuit.

5. An optical encoding method, comprising:
generating light from a light source;
transmitting the light through a code strip, the code strip comprising a calibration area, an indexing area and an encoding area;
receiving the light after it has been transmitted through the calibration area;
converting the light transmitted through the calibration area into a calibration signal;
analyzing the calibration signal to determine whether a degree of transparency of the calibration area is greater than a threshold value, the degree of transparency being decreased as contaminants are deposited on the code strip; and
if the threshold value is greater than or equal to the degree of transparency, increasing a current provided to the light source to increase a brightness thereof.

6. The optical encoding method of claim 5, further comprising providing a wiper configured to wipe the code strip and wiping of code strip with the wiper according to a predetermined schedule.

7. The optical encoding method of claim 5, wherein The brightness of the light is modulated according to the electrical calibration signal.

8. The optical encoding method of claim 5, wherein The brightness of the light is modulated according to the degree of transparency of the calibration area of the code strip.

9. The optical encoding system of claim 1, wherein the current is increased when the degree of transparency is a predetermined amount above the threshold value.

10. The optical encoding method of claim 5, wherein the degree of transparency of the calibration area is representative of the degree of transparency of the code strip as a whole.

* * * * *

UNITED STATES PATENT AND TRADEMARK OFFICE
CERTIFICATE OF CORRECTION

PATENT NO. : 7,291,831 B2
APPLICATION NO. : 10/799850
DATED : November 6, 2007
INVENTOR(S) : Seela Raj D. Rajaiah et al.

It is certified that error appears in the above-identified patent and that said Letters Patent is hereby corrected as shown below:

Title Pg, Item (75) Assignee: delete "ECBUIP" and insert -- ECBU IP --;

Column 4, Line 54, Claim 1, after "source" insert -- to --;

Column 8, Line 1, Claim 7, after "wherein" delete "The" and insert -- the --;

Column 6, Line 6, Claim 8, after "wherein" delete "The" and insert -- the --.

Signed and Sealed this

Twenty-sixth Day of October, 2010

David J. Kappos
*Director of the United States Patent and Trademark Office*